No. 697,915. Patented Apr. 15, 1902.
J. HALEY.
BOTTLE OR JAR PRESS.
(Application filed Feb. 18, 1901.)
(No Model.) 5 Sheets—Sheet 4.
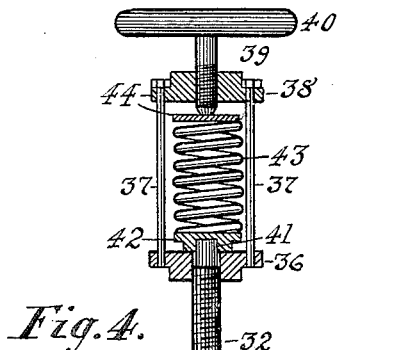
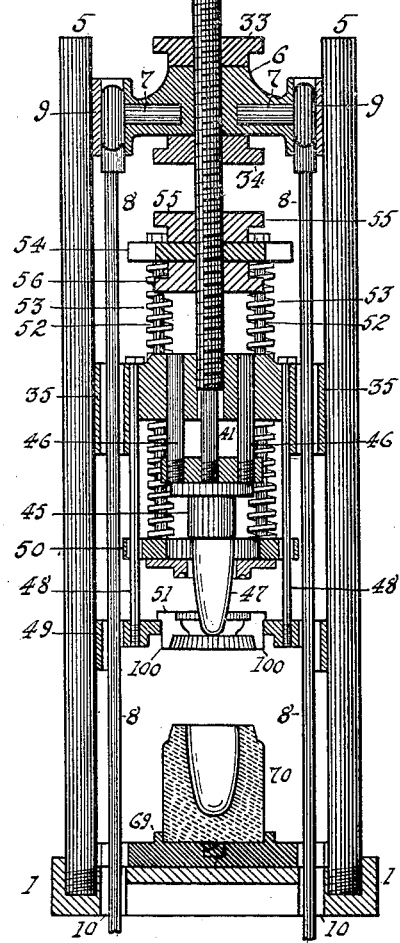
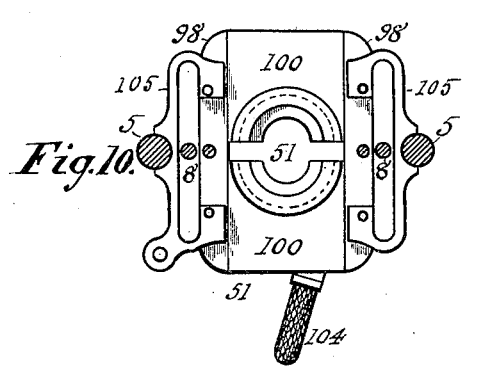
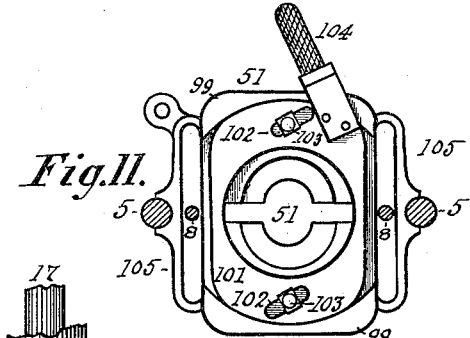
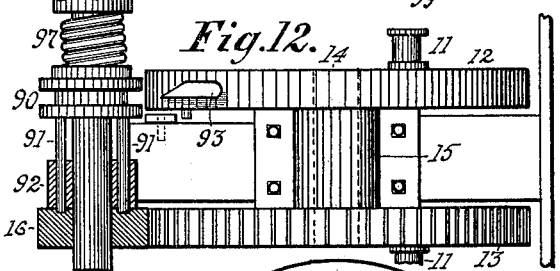
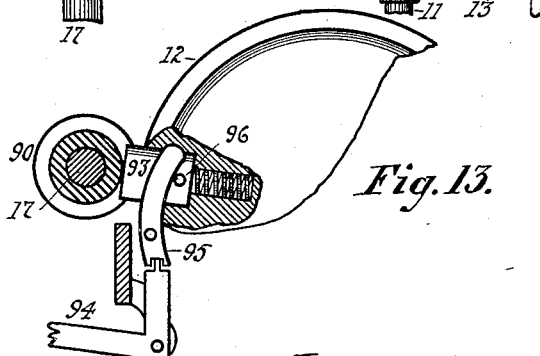
Witnesses:
Inventor
Jonathan Haley,
By Humphrey & Humphrey,
Attorneys.

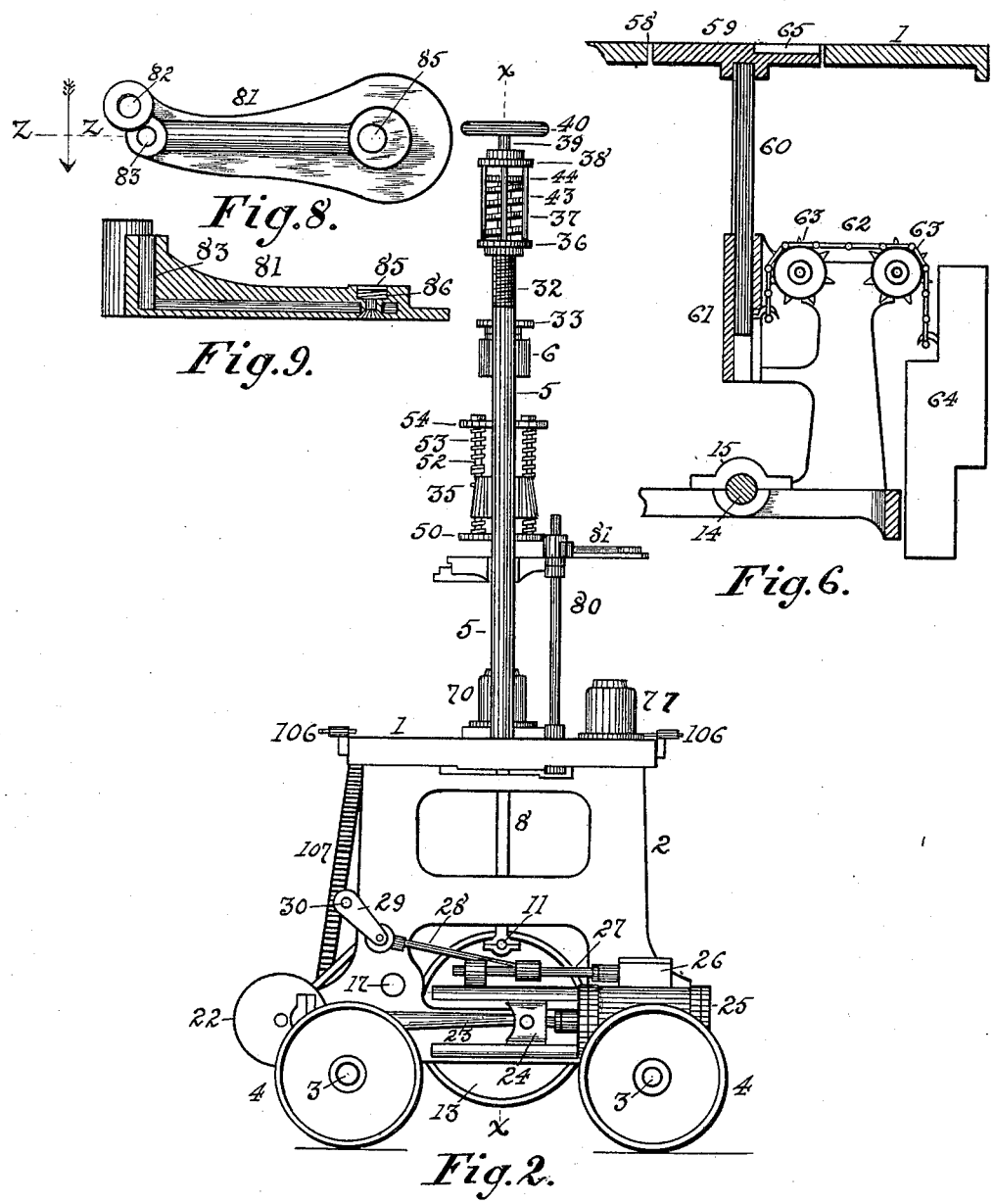

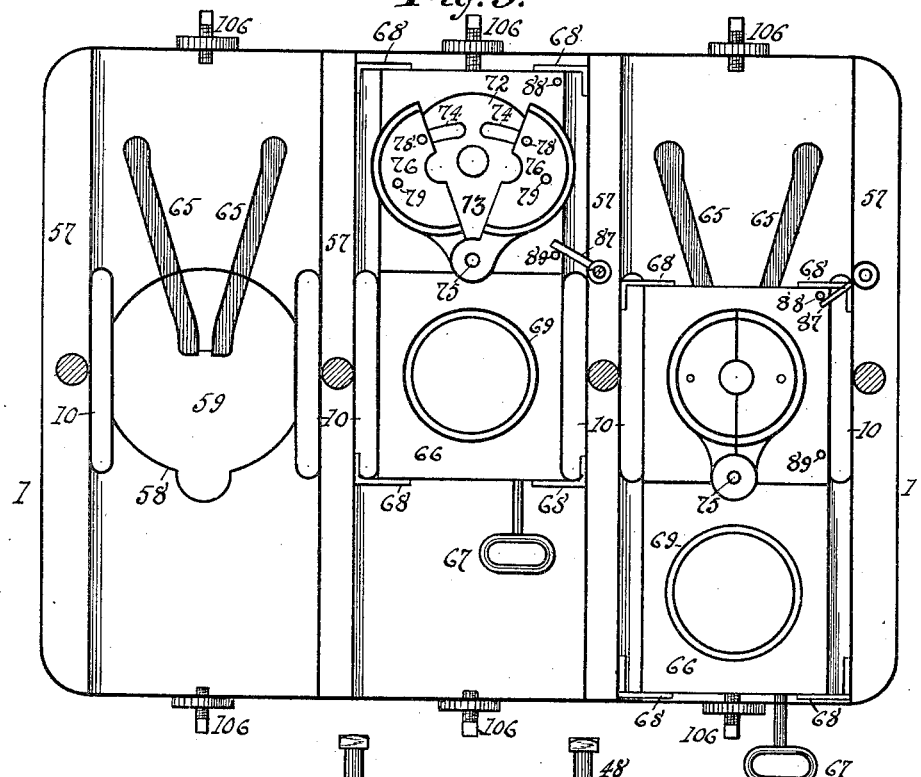
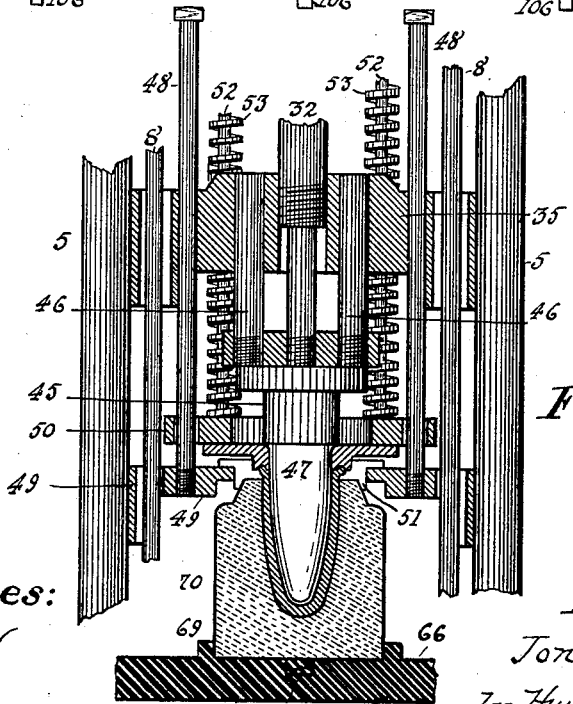

No. 697,915. Patented Apr. 15, 1902.
J. HALEY.
BOTTLE OR JAR PRESS.
(Application filed Feb. 18, 1901.)

(No Model.) 5 Sheets—Sheet 5.

Witnesses: Inventor:
Jonathan Haley,
By Humphrey & Humphrey,
Attorneys.

UNITED STATES PATENT OFFICE.

JONATHAN HALEY, OF AKRON, OHIO.

BOTTLE OR JAR PRESS.

SPECIFICATION forming part of Letters Patent No. 697,915, dated April 15, 1902.

Application filed February 18, 1901. Serial No. 47,789. (No model.)

*To all whom it may concern:*

Be it known that I, JONATHAN HALEY, a citizen of the United States, residing at Akron, in the county of Summit and State of Ohio, have invented a certain new and useful Improvement in Bottle or Jar Presses, of which the following is a specification.

My invention has relation to improvements in machines for making glass jars and bottles. The objects of my invention are to produce a machine in which the article to be made will first be partially formed by a mold and plunger and afterward completed by blowing with compressed air and which machine shall embody apt means for receiving and pressing the molten glass and subsequently removing the plunger and closing the mold and partially-formed article and introducing air under pressure to complete the operation, and then shifting the mold and causing it to open to release the completed article to permit its removal; and its further object is to render the machine practically automatic in the performance of its different successive functions.

A still further object is to embody in and connect with the mechanism compressed-air or steam engines to afford power for actuating the machinery, which shall be directly supported by the machine, to the end that the machine shall be complete in itself without the necessity of outside power; and a final object is to produce a multiple of severally-acting machines operated by the same power by which a single operator and helper may triple the output in a given time with substantially the same labor, aided by the automatic character of the machine.

To the aforesaid objects my invention consists in the peculiar and novel construction, arrangement, and combination of parts hereinafter described and then specifically pointed out in the claims, reference being had to the accompanying drawings, which form a part of the specification.

Figure 1:
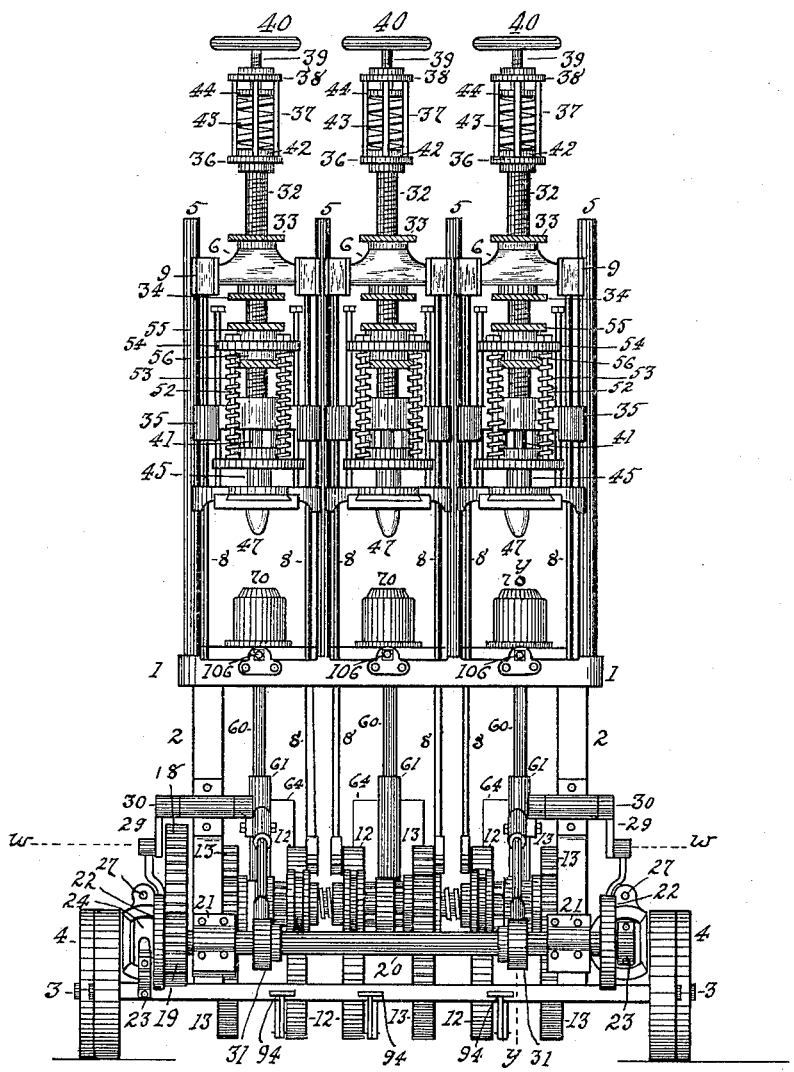
Figure 7:
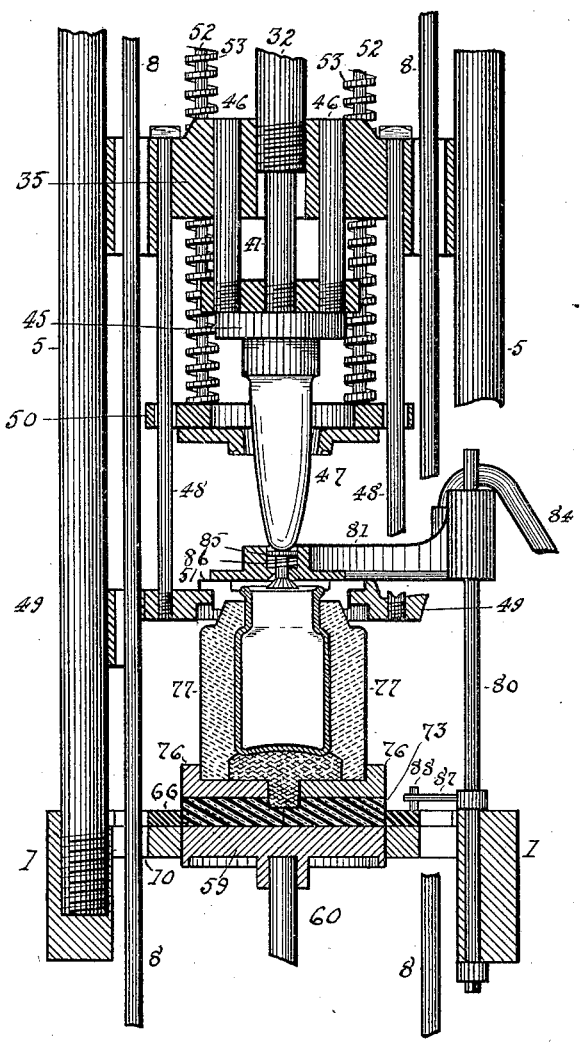

In the accompanying drawings, in which similar reference-numerals indicate like parts in the different figures, Figure 1 is a front elevation of my improved machine; Fig. 2, a side elevation of the same looking from the right of Fig. 1; Fig. 3 a plan, enlarged, of the table-top with the sliding mold-holding plate removed from the left slide; Fig. 4, an enlarged front view above the table in section at the line $xx$ of Fig. 2, and showing the parts in the position prior to the descent of the plunger and with a solid mold; Fig. 5, a similar view further enlarged and broken at top and bottom and showing the plunger at the end of its down stroke; Fig. 6, a fore-and-aft section, enlarged, through one of the mold-supports and adjacent parts at the line $yy$ of Fig. 1; Fig. 7, a section on the scale of Fig. 5 on the line $xx$ of Fig. 2, illustrating a separable mold with the inflating arm and valve and the parts in position at the time of completing the blowing of the jar; Fig. 8, a top plan, enlarged, of the inflating-arm; Fig. 9, a section of said arm at the line $zz$ of Fig. 8; Figs. 10 and 11, a top and inverted plan, respectively, of the separable neck-mold with the connected parts in section at its top and bottom planes; Fig. 12, a plan, enlarged, of a pair of the crank-carrying wheels for operating the connecting-rods to reciprocate the plunger at the line $ww$ of Fig. 1; and Fig. 13, a side view of a portion of the upper wheel of Fig. 12 and partially broken away to show the latch for automatically arresting the pressing machinery at the completion of the glass article.

Referring to the figures, 1 is a table, preferably of cast-iron, supported on side pieces 2, that rest on and are secured to axles 3, on which are mounted wheels 4. From the top of the table arise pairs of guide-rods 5, between each pair of which is located a cross-head 6, carrying in each end projecting wrist-pins 7, on which are fitted the upper ends of pairs of connecting-rods 8. Fitting the outer ends of these cross-heads, to retain the connecting-rods and form slides, are lateral caps 9, secured to the ends of the cross-heads in any approved manner and outwardly grooved to fit and slide on the guide-rods 5. The connecting-rods 8 pass downwardly through slots 10 in the table 1, and at the bottom each pair is journaled on wrist-pins 11 in oppositely-disposed wheels 12 13, mounted on the ends of short shafts 14, journaled in boxes in the lower part of the machine, one whereof is shown in Fig. 12. Each wheel 13 has gear-teeth in its periphery, that mesh in small gears 16, freely mounted on a shaft 17, journaled in the opposite side pieces 2 of the machine. On one end of the shaft 17, the left in Fig. 1, is a large tight gear 18, which meshes in a smaller gear 19 on the driving-shaft 20, which is journaled in boxes 21 on the side pieces 2. The engine-shaft 20 bears at each end a disk crank-head 22, each provided with a wrist-pin on which is journaled one end of a pitman 23, that is mounted at the other end on a wrist in a cross-head 24 between guides that are secured to the front ends of the engine-cylinders 25, secured to the side pieces 2, and this cross-head 24 is driven by a piston-rod from a piston in the cylinder. Each cylinder 25 has the usual steam chest 26, provided with a valve-rod 27, operated by a rod 28 from a crank-arm 29 on a rock-shaft 30, which bears another crank-arm at the opposite end, moved by a connecting-rod from an eccentric 31 on the shaft 20. The inlet and exhaust pipes of these two engines are not shown, as they do not differ from ordinary engines, and they may be driven by steam or, preferably, compressed air.

Through the cross-head 6 freely passes a hollow externally-screw-threaded shaft 32, adjustably retained in the cross-head by upper and lower nuts 33 34, and on the lower end of this shaft is secured a second cross-head 35, arranged to move with the shaft 32 and slide on the guide-rods 5 and provided with lateral openings in which the connecting-rods 8 are free to move. On the upper end of the hollow shaft 32 is a disk 36, in which are secured a number of parallel rods 37, to the tops of which is fastened a like disk 38, having in its center a screw-threaded opening in which runs a screw 39 with a hand-wheel 40. Within the shaft 32 is a sliding solid shaft 41, to the top of which is secured a circular head 42, on which is a coiled spring 43, on the upper coil of which is a plate 44 that the screw 39 presses on. By this arrangement the shaft 41 will move in unison with the shaft 32 until its lower end encounters such resistance as will overcome the spring 43, when it will rise in the shaft 32, the amount of pressure of the spring 43 being regulated by the screw 39 and for a purpose to be stated. On the lower end of the shaft 41 is secured a plunger-head 45, having a number of guide-rods 46, that slide in the cross-head 35, and to this head 45 is secured a plunger 47.

Through the cross-head 35 are a number of sliding rods 48, having heads on their upper ends to prevent their falling through and with their lower ends secured in the neck-mold cross-head 49, which also has lateral openings to permit the passage of the connecting-rods 8 and is arranged to slide on the guide-rods 5. Between the cross-head 35 and the neck-mold cross-head 49 is the rim-mold carrier 50 which carries the rim-mold 51, and is supported by a series of rods 52, each surrounded by a coiled spring 53 and passing with their springs freely through the cross-head 35. As they pass through the cross-head 35 back and front of the sectional planes of the drawings, these openings do not appear in the figures. The upper ends of these rods 52 pass freely through a circular plate 54 on the hollow shaft 32, adjustably retained by upper and lower nuts 55 and 56; but their surrounding springs engage and cannot pass said plate.

On the upper face of the table 1 are parallel ridges 57, forming parallel ways equal in number with the plungers centrally located thereunder and extending from front to rear. Centrally between front and rear of each way is an opening 58 with a small lateral extension, for a purpose to be stated, arranged to be closed by a circular plate 59, mounted on the upper end of a shaft 60, and is constantly drawn up by a sprocket-chain 62, that runs on wheels 63 and bears at its opposite end a weight 64. In the upper end of each plate 59 and continuing in the face of the table that forms the way are divergent channels 65. Fitted to slide in the ways made by the ridges 57 are plates 66, each provided with a handle 67, by which they may be moved forward and back, their movement in each direction being limited by adjusting-screws 106, that pass through lugs at each end of the ways, Fig. 3. These plates are less in width than the ways, so as not to obstruct the slots 10 for the connecting-rods, but are provided on both sides of each end with L-shaped fingers 68, that run against the ridges 57 and act as guides for the plates. The front upper face of each plate 66 is solid and bears an annular ridge 69 to form a seat for the blank-mold 70. The back upper face of each plate 66 is on the plane slightly lower than the front and has a circular opening 72 with a lateral extension, and in this opening is freely fitted a solid plate 73, having a lateral rounded extension and two opposite curved slots 74. Hinged to this plate 73 and to each other by a pin 75 are two semicircular plates 76, provided with flanges about their curved edges to form a seat for the blow-mold 77. From the under face of each plate 76 are pairs of depending pins 78 79, the first, 78, arranged to run through the curved slots 74 into the divergent channels 65, and the second pair, 79, to fit in the corresponding halves of the blow-mold and cause them to separate at the medial line, leaving the finished product resting on the central lower floor of the mold, which is retained central by having a depending central pin which enters the plate 73, and as the members of the blow-mold part the crowning portion of the stationary floor will support the jar.

Revolubly secured in the table 1 adjacent to each right guide-rod 5 is a vertical rod 80, on which is mounted to slide a horizontal inflating-arm 81. This arm (shown in plan and section in Figs. 8 and 9) has an opening 82, arranged to fit the rod 80, and has the opposite end enlarged into a circular plate flat on the under side. Lengthwise through this arm is an air-duct 83, opening upwardly near the hole 82 for the purpose of attaching an air pipe or tube 84, Fig. 7, and opening at the opposite end centrally of the circular portion both up and down, the lower end of the opening being conical to receive a downward-opening valve, the upper end being enlarged to receive a circular cap 85 of the valve-stem and permit its descent therein and a spring 86 to hold the valve closed. This arm is so arranged that when it is swung inward the circular portion will rest on top of the rim-mold, hereinafter to be described. To cause this arm to swing and return, there is a tappet 87 on the rod 80, that overhangs the table 1, and this is arranged to be engaged alternately by pins 88 89 in the sliding plates 66, Fig. 3, these parts being so adjusted and arranged that when one of these plates is drawn forward the arm will be forced to swing inward over the mold, and as the plate is returned it will swing back out of the way of the mechanism. It may be noted here to avoid confusion that this arm is curved, so as to reach its position over the mold without encountering any of the vertical shafts or rods. To cause the engines to operate this machinery, there is fitted to slide on and turn with the shaft 17, opposite each mold, a grooved collar 90, provided with pins 91, Fig. 12, running through a fixed collar 92 and arranged when forced through to enter corresponding holes in the small free gear 16, and thus cause this gear to revolve with the shaft and turn the wheels 12 13. This collar is constantly forced toward the collar 92 by a spring 97. In a recess in each wheel 12 is a radially-acting sliding outwardly-spring-pressed bolt 93, Figs. 12, 13, having a beveled face and adjusted and arranged as the wheel revolves to engage one flange of the grooved collar 90 and force it back from the collar 92, thus drawing the pins 91 out of the holes in the gear 16 and permitting it and the gear 13 and connected machinery to instantly stop. When it is desired to start the press to which this peculiar gear belongs, the operator presses down the outer end of the corresponding bell-crank lever 94, pivoted in a cross-bar of the machine, which is constantly raised by a coiled spring 107, (shown only in Fig. 2, as its presence in Fig. 1 would tend to obscure lines,) which cross-bar rocks outward the lower end of a pivoted lever 95, Fig. 13, and forces the upper end, which rests against a pin 96 in the bolt 93, inward, thus releasing the grooved collar 90 to move along the shaft 17 by force of the spring 97 and again force the pins 91 into the gear 16.

When the pressing mechanism is in its stationary position, the cross-head 6 and all associated parts are raised, as in Fig. 4, and the parts are so adjusted that upon setting any one of the presses in motion the wheels 12 13 associated with that press will make one revolution, thus causing the pressing mechanism to descend and rise, when the motion will be arrested by the action of the bolt 93, as just described.

The neck-mold 51, hereinbefore referred to and shown in top and inverted plan in Figs. 10 and 11, is necessarily separable to permit the withdrawal of the completed article, and consists of two oppositely-disposed side plates 98, united at their under ends by plates 99, which have their inner edges curved on lines concentric with the center of the device. The inner adjacent edges of the side plates 98 are beveled outward from their top faces, thus forming ways in which are fitted to slide two like plates 100, having in their adjacent ends molded semicircular openings arranged when the plates meet to constitute the neck-mold. Below the plates 100 is a plate 101, having its ends curved to conform to the curved end plates 99 and arranged to rest between them and provided with a central opening of sufficient size to avoid touching the body of the jar being formed. In the plate 101 are slots 102, inclined at an angle with the axis of the plate, through which slots pass bolts 103, severally secured to the opposite plates 100. A handle 104 affords means for rocking the plate 101. This mold has side wings 105, secured in any approved manner, having outward grooves to run on the guide-rods 5 and having lateral slots to permit the movement of the connecting-rods 8, and is supported by the rods 48, hereinbefore referred to.

The operation of the machine is as follows: Each one of the presses operating in the same manner, the blank-mold 70, resting on the plate 66 in the ring 69, has a suitable mass of molten glass placed therein and is pushed back to the position shown in the central part of Fig. 3, thus bringing it directly under the plunger 47. The machine is then started by pressing the appropriate lever 94, thus releasing the collar 90 and permitting the gear 16 to turn the gear 13 and by means of the rods 8 to draw down the upper cross-head 6 and its connected parts, which descend and are arrested in the following order: First, the neck-mold reaches the blank-mold 70, and fitting on the tapering portion thereof forms a tight cap with a central opening. The plunger 47 next descends and enters the mold, squeezing the plastic glass into a cup and forcing it up in the neck-mold until arrested by the rim-mold, which forms the rim. In this process the rods 48 slide through the cross-head 35, and the springs 53 and 43 perform important functions, the first to allow the plunger to continue its descent after the neck-mold has reached the blank-mold, the second to prevent injury to the parts from a surplus of glass in the mold. The machine continuing in motion, the cross-head 6 rises with the connected parts in the reverse part, the plunger first leaving the blank thus formed in the mold and the neck-mold following, raised by the rods 48, and draws the blank with it, the latter being held by the glass that has filled the annular enlarged space of the neck-mold. The plate 66 is then drawn forward until the blow-mold 77 is under the plunger, when the parts again descend until the glass blank is within the mold. The operation of drawing the plate forward has closed the blow-mold by the mechanism heretofore described. Simultaneously the arm 81 is swung around so that its flat portion is directly above the rim of the blank in the blow-mold, which is done by the pin 88 engaging the tappet 87. The plunger continuing to descend, its point first presses on the cap 85 and opens the valve, thus permitting the compressed air to enter the blank. The parts being in this position continue to descend through the table, this being permitted by the plate 59, rod 60, chain 62, and weight 64 until the return stroke of the cross-head 6, when the parts rise and the plunger leaves the valve. As the parts return the handle 104 is rocked, thus releasing the neck-mold and permitting the blow-mold and completed article therein to stand free in the mold. The plate 66 is then pushed back, by which two results are produced. The pin 89 encounters the tappet 87, thereby turning the rod 80 and swinging the inflating-arm 81 to its original position, while the pins 79 run in the grooves 65 and open the blow-mold, thus leaving the completed article free upon the central crowning portion of the mold. As the presses are duplicates in their operation, the foregoing description will apply to all.

Having thus described my invention, what I claim, and desire to secure by Letters Patent, is—

1. In a machine of the class designated the combination with a supporting-table having vertical parallel guides, and a blank-mold, of a cross-head to slide in said guides, having a vertical orifice, a screw-threaded hollow shaft in said orifice, adjustably secured therein, a cross-head below said first cross-head secured to the lower end of said hollow shaft, a rim-mold below said second cross-head sustained by rods supported and slidable in a plate adjustably secured between the first and second cross-heads, and pressed downward by springs resting against said plate, a third cross-head below said rim-mold with a neck-mold supported therein sustained by rods slidable in the second cross-head, and adapted to fit and form an annular top for the blank-mold, a shaft within said hollow shaft-spring pressed at the top and bearing a plunger to enter the neck and blank mold, and means for vertically reciprocating said upper cross-head, substantially as shown and described.

2. In a machine of the class designated the combination with a supporting-table having vertical parallel guide-rods, a cross-head arranged to slide therein carrying a hollow shaft adjustably secured therein attached to a second lower cross-head, a vertically-sliding spring-pressed shaft within the hollow shaft bearing a plunger, and a spring-pressed rim-mold below the second cross-head sustained by rods passing through the second cross-head slidably secured in a plate adjustably secured on said hollow shaft; and a cross-head below said rim-mold sustained by rods upwardly slidable in said second cross-head, and adapted to fit and form an annular cover for a blank-mold, and a blank-mold supported on said table and adjusted to receive said neck-mold and plunger, of wrist-bearing wheels below said table having connecting-rods running through said table to move said upper cross-head, and a motor attached to said table to move said wrist-bearing wheels, substantially as shown and described.

3. In a machine of the class designated the combination with the table and blank-mold supported thereon with vertical guides and a cross-head bearing an adjustable hollow shaft secured in a second lower cross-head, and a shaft vertically movable within the hollow shaft, spring-pressed at the top and bearing a plunger at the lower end adapted to enter the blank-mold; and a rim-mold inclosing said plunger sustained from a plate adjustably secured to the hollow shaft above said second cross-head by rods free to slide in said plate, and bearing-springs to press said rim-mold, and a neck-mold adapted to fit said blank-mold, and sustained by rods arranged to slide in said second cross-head, of two wrist-bearing wheels journaled on a shaft below said table, one whereof has gear-teeth; connecting-rods from said wrists to said upper cross-head, a power-shaft counter to said wheel-bearing shaft having a free gear to engage the wrist-bearing gear-wheel, clutch mechanism to cause said free gear to run with its shaft, and a device upon said opposite wrist-bearing wheel to release said clutch mechanism at a predetermined time, substantially as shown and described.

4. In a machine of the class designated the combination with a supporting-table having vertical guides and a cross-head adapted to slide therein, with a hollow shaft adjustably secured therein, and a second cross-head running as said guides secured to the lower end of said hollow shaft bearing a plunger; a downwardly spring-pressed rim-mold surrounding said plunger supported from a plate secured on the hollow shaft, and a vertically-sliding neck-mold supported from said second cross-head of a sliding plate arranged to bring a blank-mold in alinement with said plunger, and a motor arranged by suitable connections to reciprocate said first cross-head, substantially as shown and described.

5. In a machine of the class designated the combination with a supporting-table of a vertically-reciprocating plunger and means for operating it, a sliding plate arranged to hold the blank-mold, and separable blow-mold and to bring them successively under said plunger with an opening in said table to permit the descent of the blow-mold, and an upwardly-pressed vertically-moving plate to receive and hold said blow-mold, and an inflating-arm arranged to be swung into coincidence with the blow-mold by the movement of said plate, having a flat portion to rest on the jar in the blow-mold, and a valve arranged to be engaged and opened by the descent of the plunger, and to close as it recedes, and means for returning said arm, and mechanism for causing said several parts to coact, substantially as shown and described.

6. In a machine of the class designated the combination with a reciprocating plunger having a determinate vertical stroke, of a table having an opening adapted to be brought in vertical alinement with said plunger, and a verticaly-moving depressible upwardly-pressed plate within said opening, a blow-mold adapted to rest on said plate, an inflating-arm adapted to swing above and close said blow-mold, and means for swinging it, a valve in said arm arranged to be engaged and opened by the descent of said plunger, said arm being arranged to descend and rise with said mold and plunger, and means for returning said arm, substantially as shown and described.

7. In a machine of the class designated the combination with a table and a way thereon for a sliding plate, and diverging grooves in the face of said table, of a sliding plate arranged to move therein provided with a separable blow-mold with the halves hinged at one side, and pins depending from the base thereof through slots in said plate and adapted to run in said grooves, to open and close said mold as said plate slides back or forward, substantially as shown and described.

In testimony that I claim the above I hereunto set my hand in the presence of two subscribing witnesses.

JONATHAN HALEY.

Witnesses:
C. P. HUMPHREY,
C. E. HUMPHREY.